(12) United States Patent
Lappeteläinen

(10) Patent No.: US 6,771,631 B1
(45) Date of Patent: Aug. 3, 2004

(54) ENSURING QUALITY OF INFORMATION TRANSFER IN TELECOMMUNICATIONS NETWORK

(75) Inventor: Antti Lappeteläinen, Espoo (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/628,868

(22) Filed: Nov. 12, 1999

Related U.S. Application Data

(63) Continuation of application No. PCT/FI99/00224, filed on Mar. 23, 1999.

(30) Foreign Application Priority Data

Mar. 23, 1998 (FI) .................................................. 980650

(51) Int. Cl.$^7$ ........................ H04B 7/216; H04B 7/212; H04B 7/00
(52) U.S. Cl. ........................ 370/342; 370/347; 455/522; 375/130
(58) Field of Search ........................ 370/311–332, 333, 370/335, 342, 347; 455/63, 67.1, 69, 522; 714/1, 747–750; 375/295, 308, 130

(56) References Cited

U.S. PATENT DOCUMENTS

| | | | |
|---|---|---|---|
| 5,222,104 A | | 6/1993 | Medendorp |
| 5,430,760 A | * | 7/1995 | Dent ........................... 455/522 |
| 5,430,889 A | | 7/1995 | Hulbert et al. |
| 5,991,329 A | * | 11/1999 | Lomp et al. ................ 375/130 |
| 6,055,415 A | * | 4/2000 | Suzuki ........................ 455/522 |
| 6,173,016 B1 | * | 1/2001 | Suzuki ........................ 375/295 |
| 6,463,076 B1 | * | 10/2002 | Suzuki ........................ 370/528 |

FOREIGN PATENT DOCUMENTS

| | | |
|---|---|---|
| EP | 0614269 | 9/1994 |
| WO | WO 9508888 | 3/1995 |
| WO | WO 9807291 | 2/1998 |

OTHER PUBLICATIONS

"The GSM System for Mobile Communications" M. Mouly, M. Pautet.

* cited by examiner

Primary Examiner—Steven H. D. Nguyen
(74) Attorney, Agent, or Firm—Squire, Sanders & Dempsey L.L.P.

(57) ABSTRACT

In telecommunications networks, various kinds of information transfer occur where transmission periods are not transmitted. As a result of this, parts of the information packets contained in the concerned transmission periods are lost and the probability of loss of these information packets increases considerably. With the method according to the invention, the quality of information transfer is ensured in a telecommunications network where the information packet is coded and interleaved into at least two transmission periods. According to the invention, the method is characterized in that therein the transmission power of at least one transmission period related to the transmission of the same information packet is increased, when at least one transmission period is not transmitted. In another embodiment of the invention, the method is characterized in that the transmission power is increased of at least one transmission period of the same information packet, when at least one transmission period is not transmitted and when by increasing the transmission power the probability of loss of the information packet is sufficiently reduced.

18 Claims, 4 Drawing Sheets

ENSURING QUALITY OF INFORMATION TRANSFER IN TELECOMMUNICATIONS NETWORK

This application is a continuation of international application serial number PCT/FI99/00224, filed Mar. 23, 1999.

FIELD OF THE INVENTION

This invention concerns a method of ensuring quality of information transfer of an information packet, when the information packet is protected by coding and interleaved into at least two transmission periods, in radio bursts in a system implemented with TDMA technology or in power regulation periods in a system implemented with CDMA technology, for example.

TECHNICAL BACKGROUND

In the transfer of speech and data in a digital telecommunications system, such transfer errors occur in the transfer link which reduce the quality of the transferred signal. Through error correction of the digital signal to be transmitted, e.g. through channel coding and/or retransmission, and through interleaving of bits the quality of the transmission and the transfer error tolerance are improved. In channel coding, such redundant data is added to the data to be transmitted, with the aid of which the original data can be detected faultlessly in the receiver, even if the signal would corrupt during the transfer. Channel coding may be carried out e.g. as convolution coding or as repetition coding. Retransmission is used for correcting transfer errors either independently or e.g. in addition to channel coding, whereby any errors in a channel-coded transmission are corrected by a retransmission of the distorted frames. In interleaving of bits to be transmitted, the bits of several code words are mixed together, whereby adjacent bits of the signal will spread out into several radio bursts. FIG. 2 illustrates interleaving of speech bursts S1, S2 and S3 into radio bursts R1–R6. In the example shown in the figure, each speech burst S1–S3 is interleaved into four successive radio bursts. Owing to the interleaving it may still be possible to detect the signal, even if a whole radio burst were to be lost in the information transfer.

FIG. 1 in the appended drawing is a simplified block diagram of the GSM system (Global System for Mobile communications). A mobile Station (MS) is connected over a radio path with some base transceiver station (BTS), in the case shown in FIG. 1 with base transceiver station BTS1. The base station sub-system (BSS) includes a base station controller (BSC) and subordinated base transceiver stations BTS. Subordinated to a mobile services switching centre (MSC) are usually several base station controllers BSC. The mobile services switching centre is connected to other mobile services switching centres, and through the gateway mobile services switching centre (GMSC) the GSM network is connected with other networks, such as public switched telephone network PSTN, another public land mobile network PLMN or ISDN network. The whole system is monitored by an Operation and Maintenance Centre OMC.

In a mobile communications system, transmission power control is performed in mobile station MS and/or in base transceiver station BTS in order to reduce the network's noise level and compensate for fading on the radio path. Power control generally aims at preserving the received signal constantly almost at the same power level, which is as low as possible, however, so that the quality of the received signal is preserved. When the signal and/or power level in a radio communication between the mobile communications network and the mobile station drops below the desirable level, control of the transmission power may be preformed at base transceiver station BTS and/or in mobile station MS in order to improve the radio communication. The transmission power of mobile station MS is usually controlled from a fixed network with the aid of a special power control algorithm. Mobile station MS measures the reception lever (field strength) and quality of the downlink signal reveived from ase transceiver station BTS1 of the serving cell, whereas base treansceiver station BTS1 of the serving cell measures the reception level (field strength) and quality of the uplink signal received from mobile station MS. Based on these measurement results and on established power control parameters, the power control algorithm determines a suitable transmission power level, which is then made known to mobile station MS in a power control command. Power control is performed continuously during the call, e.g. in a GSM system of the TDMA type typically twice a second and in a UMTS-WCDMA system of the CDMA type (Universal Mobile Telecommunication System) 1600 times a second.

In radio systems implemented with Time Division Multiple Access (TDMA) technology, the signal is transferred over the radio path in radio bursts, some of which are reserved for trafficking use, e.g. for transmitting speech bursts or user data. At times such a traffic channel may be stolen for other than trafficking use, e.g. for signaling, when an extra need for signaling occurs unexpectedly (in-burst signalling). Hereby the information which is intended for transmission in the stolen radio burst will not be transmitted, but owing to coding and interleaving of the information it may be possible from the received radio bursts to interpret the information to be transferred. However, the likelihood that the information is lost completely, e.g. that a whole speech burst is lost, will grow considerably as the information in the end of the information packet is subjected to the effect of transfer errors on the transfer path.

In code division multiple access (CDMA) radio systems, the function is based on spread spectrum communication. The data signal to be transmitted is multiplied by a special hash code, whereby the transmission will spread onto a wide-band radio channel. Hereby several users may use the same wide-band radio channel at the same time for transmitting CDMA signals processed by different hash codes. In CDMA systems, the special hash code of each subscriber will hereby produce a traffic channel in the system, in the same sense as a time slot in TDMA systems. When required, one or more power control periods of a traffic channel may be stolen for signalling use, whereby the information which was to be transmitted in these power control periods will not be transmitted. The stealing of power control periods for other use causes an increased probability of loss of the information packet, like the stealing of radio bursts in a TDMA system.

Discontinuous Transmission (DTX) means a functionality where the transmission of a mobile station or a base transceiver station on the radio path can be cut off, when the signal to be transmitted does not contain any information significant to the recipient, e.g. for the duration of pauses in speech. The purpose of this is to reduce the transmitter's consumption of current, which is very essential for a mobile station, and to lower the noise level of the network. Discontinuous transmission is generally known in connection with digital mobile communications systems. The speech activity of the signal to be transmitted is monitored in the mobile station and in the base transceiver station, and the transmission to the radio path is cut off when there is no speech information. When the speech begins again, the speech is coded and transmitted to the radio path in the proper time slot. E.g. in a radio system according to FRAMES FMA1 and implemented with WB-TDMA (Wide Band Time Division Multiple Access) technology, the WB-BETH protocol allows transposition of users, that is, the connection is cut off and the radio bursts are taken over for other use while the transmission is cut off, and the connection is again quickly set up, when the speech reoccurs. Hereby the user does not normally notice from any reduced speech quality that the channel becomes free. However, such situations become a problem, where the connection can not be re-established so quickly as required, e.g. when momentarily there is no free channel at the base transceiver station for transmission of radio bursts, or when signalling commands have collided on the radio path. Hereby the information of one or more radio bursts is lost, when radio bursts can not be transmitted. Even the non-transmission of one radio burst will result in a considerably increased probability of loss of partly lost speech bursts, because other transfer errors will result on the transfer path, besides non-transmission.

Thus, the problem in the above-mentioned information transfer situations is the loss of parts of speech bursts contained in the radio burst or in the power control period, and thus the considerably increased probability of loss of the speech bursts in question. In addition, the quality of speech may then suffer.

BRIEF SUMMARY OF THE INVENTION

The purpose of this invention is to reduce the probability of loss of coded and interleaved information packets, especially when one or more transmission periods are not transmitted for some reason.

This objective is achieved by methods according to the invention, which are characterised by what is said in the independent claims 1 and 8. Special embodiments of the invention are presented in the dependent claims.

The invention is based on the idea that the transmitter increases the transmission power for at least one transmission period containing at least a part of an information packet, a part of which has not been transmitted. The increase of transmission power is performed when at least one transmission period is not transmitted. When information packets are coded and interleaved between several transmission periods, an allocated increase of the transmission power hereby reduces transfer errors in these transmission periods to be sent and makes it less likely that information packets are lost entirely or that the quality of the information transfer will suffer. Lost information is patched by increasing the transmission power. In another method of embodying the invention, the increase of transmission power is done for at least one transmission period when at least one transmission period is not transmitted and when the increase of transmission power allows rescuing of the information packet.

In this application, a transmission period means a coherent period during which power control can not be performed, that is, a period between two successive power controls, when power control is performed at the maximum frequency. The transmission period includes one radio burst in a TDMA system and one power control period in a CDMA system.

It is an advantage of the method according to the invention that the release of a channel, e.g. for the time of a speech pause, and the theft of a radio burst for other use cause less of a risk of reduced speech quality.

It is another advantage of the method according to the invention that it will not cause any extra traffic or signalling on the transfer path.

In addition, it is an advantage of the method according to the invention that it is possible with its aid quickly to compensate for any increased probability of a loss of an information packet.

The method also achieves the advantage that the need for retransmission is reduced, whereby the capacity of the cell will increase.

It is also an advantage of the method according to the invention that any increase of transmission power can be targeted at a real need, because the transmitter knows for sure that reception is not possible, since the transmission period was not sent in the first place.

BRIEF DESCRIPTION OF THE DRAWINGS

The invention will now be described in greater detail in connection with preferable embodiments and referring to the examples shown in FIGS. 3–6 of the appended drawings, wherein.

DETAILED DESCRIPTION OF THE INVENTION

Figure 1:
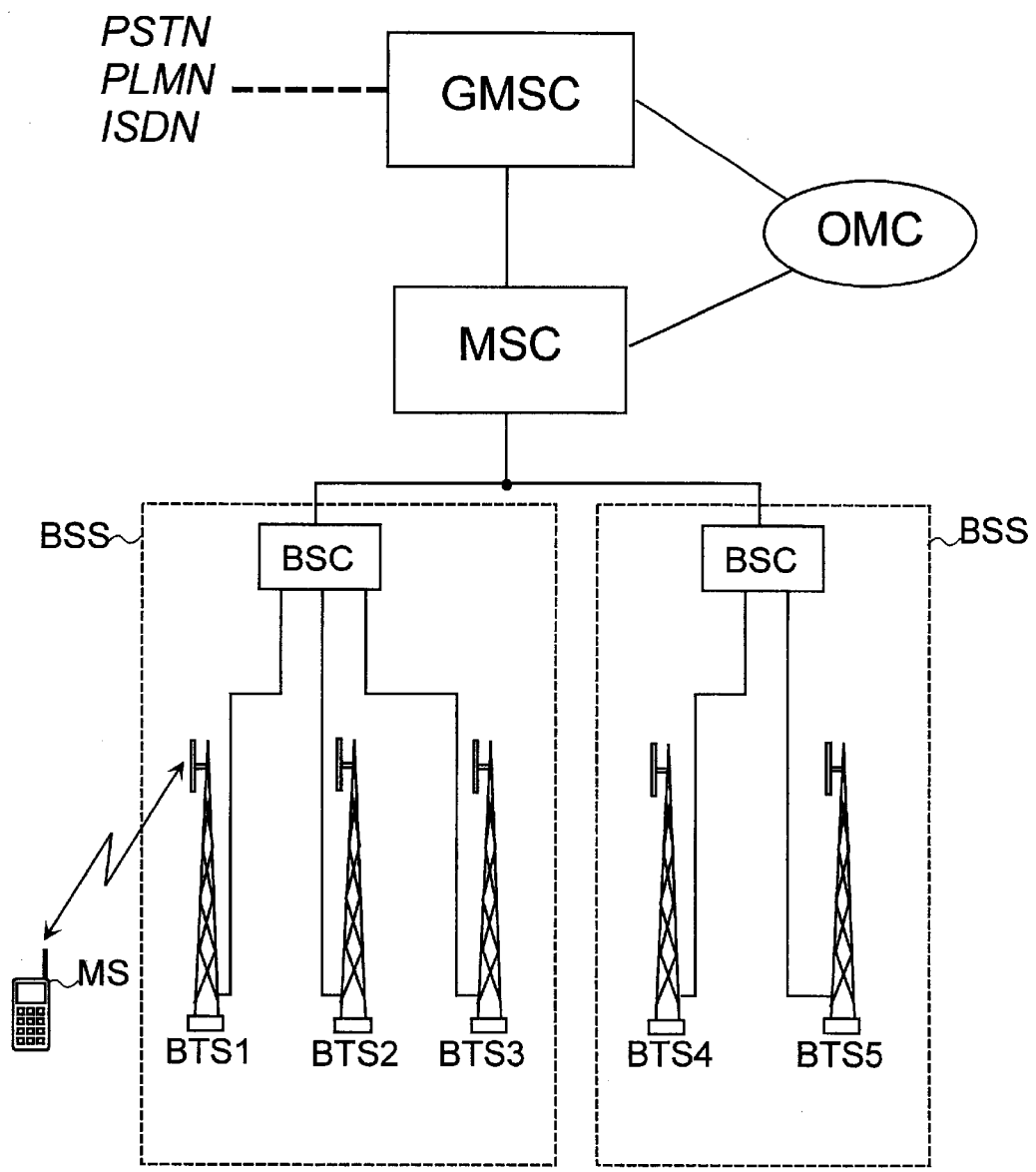
FIG. 1 shows those parts of a mobile communications network which are essential for the invention.
Figure 2:
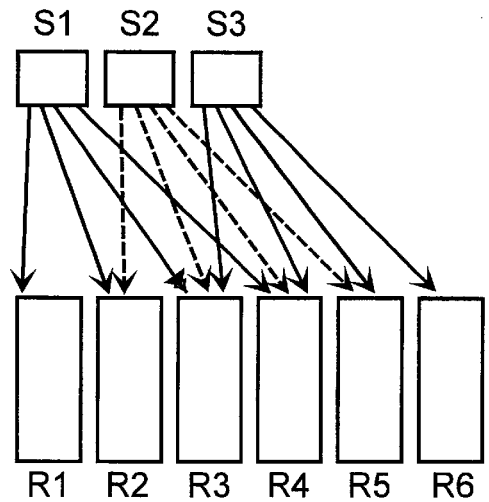
FIG. 2 shows state-of-the-art interleaving of information packets into several radio bursts.

The present invention can be applied in connection with any mobile communications system. In the following, the invention is described in greater detail by way of example and primarily in connection with a digital GSM mobile communications system and FRAMES FMA1 radio network. FIG. 1 shows the structure of a GSM network, which was described above. As regards a closer description of the GSM system, reference is made to GSM recommendations and to the book "The GSM System for Mobile Communications", M. Mouly & M. Pautet, Palaiseau, France, 1992, ISBN:2-9507190-0-7.

In the following, the invention is described more closely in the light of a first embodiment of the invention and referring to FIG. 3.

Figure 3:
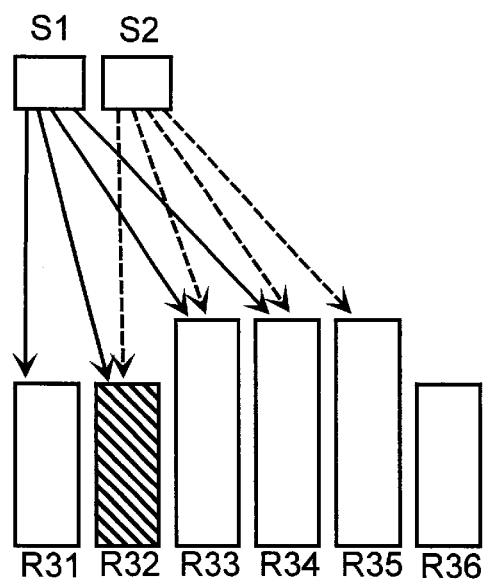
FIG. 3 shows the effect of a first embodiment of the method according to the invention on the transmission power of radio bursts, when one radio burst is not transmitted.

FIG. 3 illustrates the functionality of the method according to the invention when radio burst R32 is not transmitted for some reason, e.g. when a radio burst is stolen for some other use or when after a DTX cut-off no free channel can be found for the moment. Coded speech bursts S1 and S2 shown in the figure are interleaved into four successive radio bursts. When the second one-fourth of speech burst S1 is not transmitted, the transmission power of the other radio bursts containing speech burst S1 is increased in accordance with the invention, in the example shown in FIG. 3, the transmission power of radio bursts R33 and R34. Also the first one-fourth of speech burst S2 is not transmitted, whereby in accordance with the invention the transmission power of the other radio bursts containing speech burst S2 is increased, in the example shown in FIG. 3, the transmission power of radio burst R35, besides radio bursts R33 and R34. Radio burst R36 again is transmitted at a normal state-of-the-art power, because this radio burst no longer holds any such parts of the information which form a common speech burst with lost radio burst R2.

Figure 4:
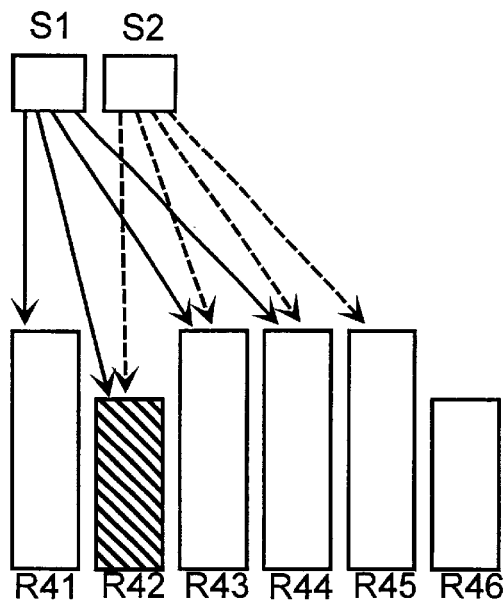
FIG. 4 shows the effect of a second embodiment of the method according to the invention on the transmission power of radio bursts, when one radio burst is not transmitted.

FIG. 4 illustrates a second embodiment of the method according to the invention. If the transmitter is able to predict non-transmission of a radio burst, the method according to the invention may also be applied to those radio bursts which are to be transmitted before the radio burst which will not be transmitted and which are related to the transmission of parts of the same speech burst. In the situation shown in FIG. 4, the transmitter knows beforehand that it is not possible to transmit radio burst R42, e.g. on account of a theft of signalling. In accordance with the invention, the transmitter increases the transmission power of those radio bursts, wherein other parts are relayed of the parts of speech bursts to be lost in radio burst R42. Hereby the radio bursts R41, R43 and R44 containing speech burst S1 are transmitted with an increased transmission power, and in addition to these, the radio burst R45 containing speech burst S2. To ensure that the other radio bursts relating to the speech burst can be transmitted with an increased transmission power and that full benefit can be derived from the method according to the invention, the non-transmission of the radio burst ought to be known n–1 burst before, wherein n is the interleaving depth.

Figure 5:
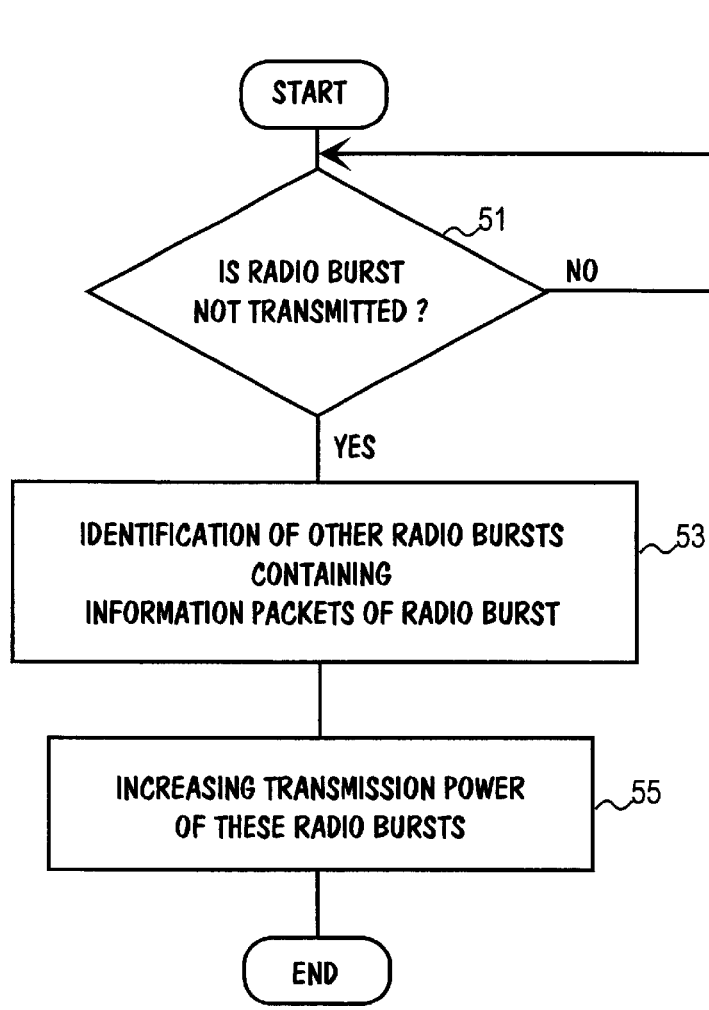
FIG. 5 is a flow chart of a first and second embodiment of the method according to the invention.

FIG. 5 shows a flow chart of a first and second embodiment of the method according to the invention. A check is made at point 51 to find out whether some radio burst was not transmitted. In the flow chart a transfer takes place to point 53, e.g. when a radio burst is stolen for other use or when after a DTX cut-off no free channel can be momentarily found. At point 53 those other radio bursts are identified, which contain parts of the information packet which is common with the radio burst not transmitted. At this point an identification is made of the radio bursts which are to be transmitted before the radio burst not transmitted and/or which are to be transmitted after the radio burst not transmitted and which relate to the same information packet, depending on whether the transmitter is able to foresee the non-transmission of the radio burst. At point 55 the transmission power of these identified other radio bursts is increased in some pre-established way.

In the other embodiments of the invention, the transmission power is increased of at least one transmission period of those containing the same information packet as the lost transmission period, e.g. one of the radio bursts, whereby it will be less likely that the information packet is lost. However, the transmission power is preferably increased of as many transmission periods as possible which relate to the lost information.

Figure 6:
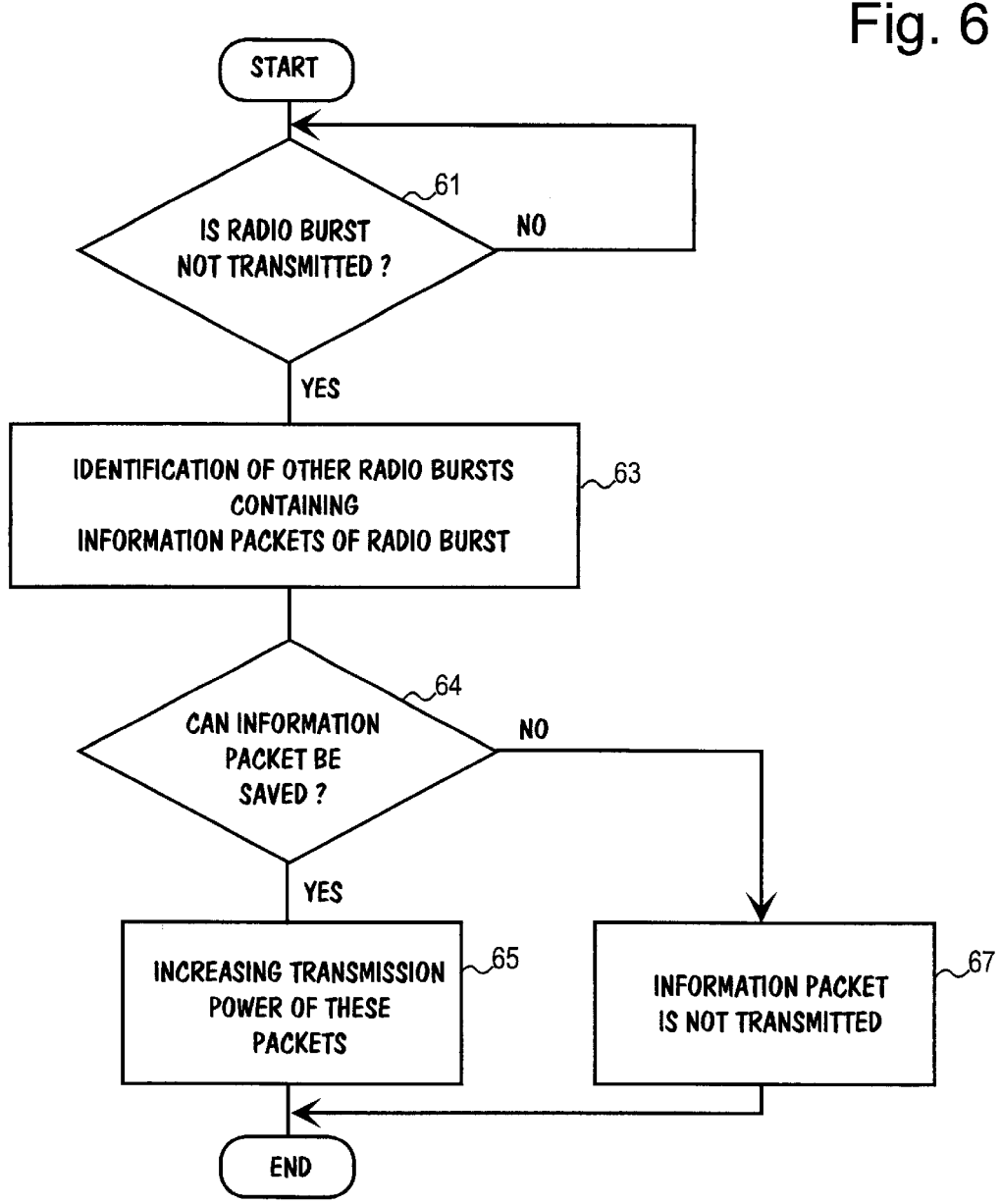
FIG. 6 is a flow chart of a third embodiment of the method according to the invention.

FIG. 6 shows a flow chart of a third embodiment of the method according to the invention. A check is made at point 61 of whether a radio burst is not transmitted. In the flow chart, a transfer occurs to point 63, e.g. when a radio burst is stolen for other use or when after a DTX cut-off no free channel is momentarily found. At point 63 those radio bursts are identified in advance and/or after the non-transmission, which contain parts of the information packet which is common with the radio burst not transmitted. A check is made at point 64 of whether the information packet can still be saved by the increase of transmission power according to the invention. This check is performed e.g. by comparing the relation of the number and interleaving depth of the lost radio bursts to the coding depth or by estimating in some other way the probability of loss of the information packet. If it is probable that the information packet can be saved, that is, the probability of loss of the information packet is sufficiently reduced after the increase of transmission power in accordance with the invention, whereby it is probable that the information packet can be received and interpreted, then at point 55 the transmission power of the other radio bursts identified earlier is increased in some pre-established manner. However, if so many radio bursts relating to the information packet have been lost that information can not be successfully transferred even by increasing the transmission power of the remaining bursts, then the remaining parts of the information packet are not transmitted and the transmission power of the radio bursts is not increased (point 67).

The increase of transmission power in accordance with the invention can be implemented in different ways, e.g. by increasing the power by a certain constant, e.g. by 3 dB, by increasing the transmission power up to a maximum power, or in such a way that the transmitted power will remain constant during an interleaving period, that is, the transmitted energy remains the same in each interleaving period. The transmission power may also be increased e.g. only when the information packet can still be saved. Otherwise there is no sense at all in transmitting the other parts of the information packet, but the network's noise level may be lowered by not transmitting even the remaining parts of the information packet, as was described above in connection with the third embodiment of the invention. The benefit derived from an increase of transmission power can be estimated e.g. by comparing the relation of the number and interleaving depth of lost radio bursts to the coding depth. E.g. if a speech burst is interleaved into four radio bursts and the convolution coding depth is ½, it is still worth while to use the method according to the invention when two radio bursts have been lost, but if three radio bursts are not transmitted out of those relaying speech bursts, then the speech burst can not be saved even by increasing the transmission power. The new increased transmission power can be defined e.g. in accordance with the following formula:

$$NewTxP[W] = \begin{cases} \min[MaxTxP.OldTxP] * (i\_size/(i\_size - lost\_slots)); & lost\_slots/i\_size < coding\_rate \\ 0; & else \end{cases}$$

wherein NewTxP is the increased transmission power, OldTxP is the state-of-the-art transmission power, MaxTxP is the maximum transmission power, i_size is the interleaving depth, lost_slots is the radio bursts lost during the interleaving period and coding_rate is the coding depth. The new increased transmission power of the radio burst is defined e.g. according to the first speech burst that can be decoded, when the radio burst contains information of several speech bursts. The increased transmission power calculated by the formula presented above is rounded off to a suitable power level. If only a part of the radio burst is stolen for other use, then lost_slots is defined as the relation of stolen information bits to all information bits.

In an advantageous embodiment of the invention, in the beginning of a connection set-up, e.g. in the beginning of a call set-up, signalling is performed from the network tot the terminal equipment that it is allowed to being using the functionality according to the invention and thus when required to increase the transmission power in accordance with the invention in the required radio bursts. Having received this permission, the terminal equipment will implement the functionality according to the invention during the information transfer connection.

The drawings and the explanation relating to them are intended only to illustrate the inventive idea. The details of the method according to the invention may vary within the scope of the claims. Although the invention has been described above mainly in connection with transmission of speech bursts, the method may be used also for other kinds of transmission, e.g. in data transmission. The method is suitable for use in connection with various kinds of channel coding and interleaving, both for transmission in packet form and for circuit switched transmission, especially in delay sensitive services, e.g. in speech transfer. The functionality according to the invention is suitable for implementation in a mobile communications system at a base transceiver station and/or in a mobile station/terminal equipment. The method may also be used in other than the mentioned situations of non-transmission of transmission periods in TDMA and CDMA systems, e.g. if synchronisation is lost temporarily or if some other erroneous function or measuring function causes non-transmission of at least one transmission period, e.g. a radio burst.

What is claimed is:

1. A method of ensuring an quality of information transfer in a mobile communications network, the method comprising:
   transmitting information via at least one information packet via a plurality of transmission periods;
   coding and interleaving said at least one information packet to be transmitted into the plurality of transmission periods;
   signaling between parties of information transfer instructions for allowing, in response to at least one of the plurality of transmission periods not transmitting at least a part of said at least one information packet, an increase of a transmission power of at least another transmission period designated for transmission of another part of said at least one information packet; and
   increasing the transmission power of said at least another transmission period.

2. The method according to claim 1, further comprising increasing a transmission power of transmission periods designated to transmit said another part of said at least one information packet after a transmission period which did not transmit said part of said at least one information packet.

3. The method according to claim 1, further comprising increasing a transmission power of transmission periods preceding a transmission period in which said part of said at least one information packet has been predicted to not be transmitted.

4. The method according to claim 1, further comprising increasing a transmission power by a pre-established constant amount.

5. The method according to claim 1, further comprising increasing a transmission power wherein a power transmitted during an interleaving period is equal to a pre-established total power.

6. The method according to claim 4, further comprising determining an increased transmission power of a transmission period according to a first information packet able to be decoded.

7. The method according to claim 1, further comprising increasing a transmission power up to a maximum power.

8. A method of ensuring a quality of information transfer in a mobile communications network, the method comprising:
   transmitting information via at least one information packet via a plurality of transmission periods;
   coding and interleaving said at least one information packet to be transmitted into the plurality of transmission periods;
   estimating a probability of loss of an information packet in response to at least one of the plurality of transmission periods not transmitting at least a part of said at least one information packet; and
   signaling between parties of information transfer instructions for allowing an increase of a transmission power of at least another transmission period designated for transmission of another part of said at least one information packet, if increasing a transmission power reduces the probability of loss of information packet.

9. The method according to claim 8, further comprising increasing the transmission power by a pre-established constant amount.

10. The method according to claim 8, further comprising increasing the transmission power wherein power transmitted during an interleaving period is equal to a pre-established total power.

11. The method according to claim 9, further comprising determining an increased power of a transmission period according to a first information packet able to be decoded.

12. The method according to claim 8, further comprising increasing the transmission power up to a maximum power.

13. A method of ensuring an quality of information transfer in a mobile communications network, the method comprising:
   transmitting information via at least one information packet via a plurality of transmission periods;
   coding and interleaving said at least one information packet to be transmitted into the plurality of transmission periods;
   estimating a probability of loss of an information packet in response to at least one of the plurality of transmission periods not transmitting at least part of said at least one information packet;
   increasing a transmission power of at least another transmission period designated for transmission of another part of said at least one information packet, if increasing a transmission power reduces the probability of loss of information packet; and
   discontinuing transmission of information packets when increasing the transmission power fails to reduce a probability of information packet loss.

14. The method according to claim 13, further comprising increasing a transmission power of transmission periods which are to transmit further parts of said at least one information packet after a transmission period which did not transmit an information packet.

15. The method according to claim 13, further comprising increasing a transmission power of transmission periods preceding a transmission period which has been predicted to transmit said part of said at least one information packet.

16. The method according to claim 13, further comprising signaling initiation of information transmission to parties taking part in the information transmission before the information transmission begins.

17. A base station transceiver comprising:

means for transmitting information via at least one information packet via a plurality of transmission periods;

means for coding and interleaving said at least one information packet to be transmitted into the plurality of transmission periods;

means for signaling with a mobile station instructions for allowing an increase of a transmission power of at least another transmission period designated for transmission of another part of said at least one information packet in response to at least one of the plurality of transmission periods not transmitting at least a part of said at least one information packet; and means for increasing the transmission power of said at least another transmission period.

18. A mobile station comprising:

means for transmitting information via at least one information packet via a plurality of transmission periods;

means for coding and interleaving said at least one information packet to be transmitted into the plurality of transmission periods;

means for signaling with a base station instructions for allowing an increase of a transmission power of at least another transmission period designated for transmission of another part of said at least one information packet in response to at least one of the plurality of transmission periods not transmitting at least a part of said at least one information packet; and means for increasing the transmission power of said at least another transmission period.

* * * * *